March 18, 1969  W. D. SUTHERLAND  3,433,075

VISUAL INDICATION OF TEMPERATURE CHANGE

Filed Jan. 30, 1967

United States Patent Office 3,433,075
Patented Mar. 18, 1969

3,433,075
VISUAL INDICATION OF TEMPERATURE CHANGE
William Drummond Sutherland, Beckenham, Kent, England, assignor to Muirhead & Co., Limited, Beckenham, Kent, England, a British company
Filed Jan. 30, 1967, Ser. No. 612,529
Claims priority, application Great Britain, Mar. 25, 1966, 13,263/66
U.S. Cl. 73—356     1 Claim
Int. Cl. G01k 11/12

ABSTRACT OF THE DISCLOSURE

A glass or like reflector for mounting in a position exposed to ambient temperature, containing a solution undergoing a color change over a particular temperature range, e.g. at or near to freezing point, whereby on activation by a light beam, a marked color change is to be observed in the reflected beam when the ambient temperature passes through the particular temperature range.

---

This invention relates to the visual indication of temperature change and more particularly to means for providing a static indication of temperature changes especially in the region of 0° C.

Certain chemical indicators are responsive to temperature change more especially when the dissolved substance changes from un-ionized to ionized form or vice versa. The ionized form tends to be the most highly colored the degree of ionization being dependent upon the polarizing ability of the solvent. This polarizing ability is a function of temperature, and hence color changes can occur with changing temperature of the solution.

The invention is directed to a temperature detector comprising a light reflecting unit adapted for mounting in a position exposed to ambient temperature, a solution of a solute in a solvent contained in the unit, the solvent having the property of changing the polarization of light transmitted therethrough as a function of its temperature, the solute having the property of changing between a substantially un-ionized form and a substantially ionized form accompanied by a marked color change when subjected to light having a level of polarization corresponding to that produced by the solvent at the ambient temperature requiring detection, and means reflecting a light beam incident on the unit back to an observer after passage through the solution to denote the existence of said ambient temperature to be detected by the color change of the reflected light beam.

In general, the dielectric constant of the solvent is an indication of its polarizing ability. In many cases a sharp change in the polarizing ability occurs at the freezing point of the solvent. In practice, a solvent should be selected with a freezing point slightly above the required temperature at which color change is required, since the resulting solution generally has a lower freezing point than the pure solvent.

The reflector can be applied to give visual indication to road users of the likelihood of icy conditions. This could take the physical form of either a reflector mounted at the side of the road such that the light reflected from the vehicle's lighting system was indicated in a different color as the temperature approached 0° C. Alternatively, the reflecting unit used to indicate lane postion (Cats' Eyes) could accommodate the medium necessary to give change of reflected color from the vehicle's lighting system as the temperature approached freezing.

The invention will be further described with reference to the accompanying drawings.

Figures 1, 2:
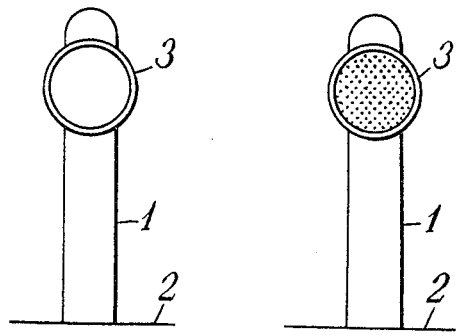
FIGURE 1 is an elevation of a reflector unit according to the invention.
FIGURE 2 is a similar view showing the reflector actuated.

In the drawings is shown a post 1 suitably placed by a road verge 2. On the post at a convenient height is mounted a reflector unit 3 filled with some convenient liquid undergoing a color change with fall of temperature below freezing such as iodine in carbon tetrachloride or alcoholic solution such that the colored reflection as shown in FIGURE 2 is obtained at ambient temperatures below a predetermined value.

Various modifications may be made within the scope of the invention.

I claim:
1. A temperature detector comprising a light-reflecting unit adapted for mounting in a position exposed to ambient temperature, a solution of a solute in a solvent contained in said unit, said solvent having the property of changing the polarization of light transmitted therethrough as a function of its temperature, said solute having the property of changing between a substantially un-ionized form and a substantially ionized form accompanied by a marked color change when subjected to light having a level of polarization corresponding to that produced by the solvent at the ambient temperature requiring detection, and means reflecting a light beam incident on said unit back to the observer after passage through said solution to denote the existence of said ambient temperature to be detected by the color change of the reflected light beam.

References Cited

UNITED STATES PATENTS

| | | | |
|---|---|---|---|
| 2,710,274 | 6/1955 | Kuehl | 73—356 XR |
| 3,025,763 | 3/1962 | Schwartz et al. | 73—356 XR |
| 3,175,401 | 3/1965 | Geldmacher | 73—356 XR |
| 3,249,930 | 5/1966 | Windsor | 73—356 XR |

LOUIS R. PRINCE, *Primary Examiner.*

WM. HENRY, *Assistant Examiner.*

U.S. Cl. X.R.

116—114.5; 307—232, 233, 288, 313; 325—346; 329—103, 110, 50, 166; 332—16